Feb. 18, 1930.                    E. PIRON                    1,747,260
                               FEEDING DEVICE
                             Filed July 12, 1926

INVENTOR.
EMIL PIRON
BY
Gifford & Scull
ATTORNEYS

Patented Feb. 18, 1930

1,747,260

UNITED STATES PATENT OFFICE

EMIL PIRON, OF NEW YORK, N. Y.

FEEDING DEVICE

Application filed July 12, 1926. Serial No. 121,829.

This invention relates to feeding granular solid material upon a movable surface in such a manner that a layer of uniform thickness is obtained without requiring the layer to be smoothed off after it has been laid upon the moving surface.

The invention is particularly applicable to the feeding of granular material that is of such a character that troubles may arise when it is attempted to feed the same. The invention is also applicable to situations in which ordinary feeding devices are apt to become choked or clogged up, or put out of commission because of products given off by the material that is being fed.

Figure 1:
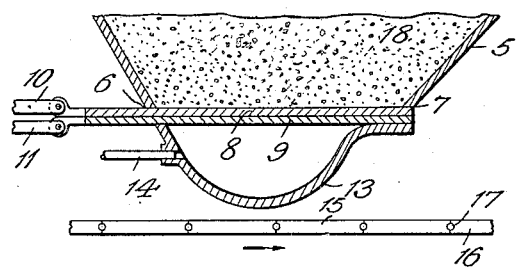
Figure 2:
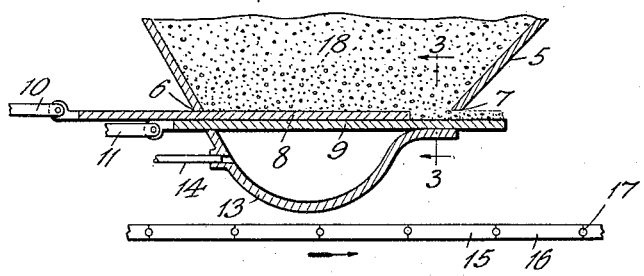
Figure 3:
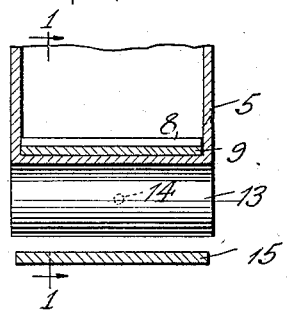

The invention will be understood from the description in connection with the accompanying drawings, in which Fig. 1 is a section along the line 1—1 of Fig. 3 showing an embodiment of the invention; Fig. 2 is a similar section showing a different position of some of the parts, and Fig. 3 is a section along the line 3—3 of Fig. 2. In the drawings reference character 5 indicates the lower portion of a receptacle that contains a supply of the material that is to be fed upon a moving surface, such as a conveyor. The container 5 is provided with holes or wide slits 6 and 7 on opposite sides thereof, through which holes flat smooth plates 8 and 9 of rectangular cross-section pass. These plates may slide upon each other. The plates 8 and 9 are connected to links or plungers 10 and 11 that they may be reciprocated in any convenient manner, so as to make the plates move as described below. A portion of the receptacle 5 below the plates 8 and 9 is extended, as shown at 13, to provide a hollow space below the plates, and a pipe 14 leads into this hollow space. A conveyor 15 upon which the material is to be laid is located below the receptacle 5 and moves toward the right. This conveyor may, for example, consist of a series of plates 16 that are linked together, as shown at 17, and may pass around sprockets to be driven in the usual manner.

In the operation of the device, the granular material 18 to be fed upon the conveyor 15 is introduced into the receptacle 5 and comes to rest upon the top plate 8 which forms the bottom of the receptacle. The links or plungers 10 and 11 are reciprocated by any convenient means, in such a manner that the plate 8 reciprocates from the position shown in Fig. 1 to the left and back to this position, while the plate 9 reciprocates to the right and back to this position, and the rate of travel of these plates is approximately the same as that of the rate of travel of the conveyor 15. As the plate 8 moves toward the left, the material 18 passes through the space and settles upon the plate 9, and is carried toward the right in a layer, the thickness of which is determined by the distance from the top surface of the plate 9 to the top edge of the opening 7, which thickness is also equal to the thickness of the plate 8. When the plate 9 reaches the end of its outward travel, it begins to return at the same rate, while, at the same time, the plate 8 moves in the opposite direction, thus pushing the layer of material forward and causing the same to drop over the end of the plate 9 upon the conveyor 15 along a distance equal to twice the distance of travel of the plate 9. At the same time, the plate 8 is pushing forward more material so that the depth of the layer upon the conveyor 15 will be the same as that upon the plate 9. During the next forward travel of the plate 9, the conveyor 15 will not be receiving material but the plate 9 will be receiving a new charge, the forward edge of which is keeping up with the rear edge of the material already spread upon the conveyor 15. It has been found desirable to have the rate of travel of the plates 8 and 9 slightly greater than the rate of travel of the conveyor 15, when the material is of such a character that it will pack or be compressed slightly before it begins to be pushed off of the end of the plate 9, so that no gap is left between the rear edge of the preceding charge on the conveyor 15 and the front edge of the succeeding charge.

This invention has been found to be especially useful in distilling coal by spreading the same in a thin layer upon a conveyor that is heated for the purpose of distilling the coal. In such a process it is very desirable that the coal be spread upon the conveyor in a thin layer to facilitate the distillation thereof, and that no uncovered spots be left on the conveyor that might radiate heat into the chamber to cause undesirable chemical reactions to take place in the distillates that come off of the coal. In carrying out the distillation of coal in such a process, the apparatus is usually enclosed in a housing or casing from which the distillates are collected, and as the same is usually at a pressure slightly above atmospheric, it is advisable to introduce steam or neutral gas through the pipe 14 into the space below the plate 9, in order to prevent the distillates from entering the receptacle 5 through the holes 6 or 7. The sides of the receptacle 5 form angles greater than 90° with the top face of the plate 8, so that when a layer of coal is moved forward by the plate 9, the coal in the receptacle 5 above the plate tends to form an arch above the corner of the opening 7, so as to be somewhat compressed and become tight against gas leaks, especially if the coal has been crushed to be somewhat fine.

In a feeder of the sort above described, the plates 8 and 9 are kept free from tar or sticky components by their sliding motion upon each other and through the openings 6 and 7 and, at the same time, the coal is positively fed onto the conveyor 15, so that a layer of uniform thickness is obtained.

The sum of the thicknesses of the plates 8 and 9 is such that the holes 6 and 7 are entirely filled. When it is desired to vary the thickness of the layer of the material upon the conveyor 15, this can be done by substituting other plates of different thicknesses, while the sum of the two thicknesses is unchanged. That is, the thickness of the layer of material will be determined by the thickness of the upper plate 8.

I claim:

1. In a device for feeding granular material, a plurality of superposed contacting reciprocating plates the end of one of which moves forward to substantially the same point as that to which the end of the other one moves backward.

2. In a device for feeding granular material, a plurality of superposed contacting reciprocating plates the end of one of which moves forward to substantially the same point as that to which the end of the other one moves backward, said plates being of the same width near their forward ends.

3. In a device for feeding granular material, a plurality of reciprocating plates the end of one of which moves forward to substantially the same point as that to which the end of the other one moves backward, said plates having smooth surfaces that slide upon each other.

4. In a device for feeding granular material, a receptacle having an opening therein, superposed contacting reciprocating members that fill said opening, and means to move said members in opposite directions.

5. In a device for feeding granular material, a receptacle having an opening therein, reciprocating members that fill said opening, and means to move one of said members away from said opening while the other one is being moved through said opening.

6. In a device for feeding granular material, a receptacle having an opening therein said opening being exposed to super-atmospheric conditions, reciprocating members that fill said opening, means to move said members in opposite directions to intermittently expose a portion of the opening and means to produce super-atmospheric pressure in said receptacle below said members to substantially balance pressures at the opposite ends of the opening.

7. In a device for feeding granular material, a receptacle having an opening therein, superposed contacting reciprocating members that fill said opening, means to move said members in opposite directions, and a conveyor below said opening.

8. In a device for feeding granular material, a receptacle having an opening therein, superposed contacting reciprocating members that fill said opening, means to move said members in opposite directions, and a conveyor below said opening moving at approximately the same speed as that of said reciprocating members.

9. In a device for feeding granular material, a receptacle having an opening therein, superposed contacting reciprocating members that fill said opening, means to move said members in opposite directions, and a conveyor below said opening moving at approximately the same speed as and parallel to said reciprocating members.

10. In a device for feeding granular material, a movable plate, means for accumulating a layer of said material of a predetermined thickness upon said plate near the end thereof, and means for pushing the material off of said plate over the end thereof.

11. In a device for feeding granular material, two movable plates, and means for accumulating a layer of said material on one of said plates as thick as the other plate.

12. In a device for feeding granular material, two movable plates, means for accumulating a layer of said material on one of said plates as thick as the other plate, and means including said other plate for removing said layer over the end of the plate upon which it has accumulated.

13. The process which comprises accumulating a batch of granular material in a layer of uniform thickness upon a moving surface and transferring said material to another moving surface in a layer of substantially the same thickness.

14. The process which comprises repeatedly accumulating batches of granular material in layers of uniform thickness upon a moving surface and transferring said material to another moving surface in a continuous layer of substantially the same thickness.

15. The process which comprises repeatedly accumulating batches of granular material in layers of uniform thickness upon a moving surface, and removing said layer longitudinally and transferring it to another moving surface in a layer of substantially the same thickness.

16. In combination in a feeding device, a reciprocating plate, means for feeding a layer of granular matter on said plate, means for limiting and determining the dimensions of said layer on said plate upon reciprocation thereof and means for discharging said layer from said plate at a predetermined time and rate.

17. In combination in a feeding device, a hopper having slits extending transversely through opposite sides thereof, a reciprocating plate extending through said slits, means for periodically loading said plate with granular matter contained in said hopper, means for limiting the dimensions of the layer carried through one of said slits by said plate upon reciprocation thereof and means for discharging said layer from said plate as desired.

18. In combination in a feeding device, a hopper having granular matter therein, opposed transverse slots adjacent the bottom of said hopper, means preventing exit of matter through one of said slots, the other of said slots acting as an exit therefor, a plate adapted to be supported by and to reciprocate on the bottom of said slots, means for periodically loading one end of said plate with granular matter contained in said hopper, said end carrying the layer of matter through said other slot and outwardly of said hopper upon reciprocation of said plate, and means for discharging said layer from the end of said plate as desired.

19. In combination in a feeding device, a hopper having granular matter therein, opposed transverse slots adjacent the bottom of said hopper, means preventing exit of matter through one of said slots, the other of said slots acting as an exit therefor, a plate adapted to be supported by and to reciprocate on the bottom of said slots, means for periodically loading one end of said plate with granular matter contained in said hopper, said end carrying the layer of matter through said other slot and outwardly of said hopper upon reciprocation of said plate, the sides and top of said slot limiting and determining the dimensions of the layer passing therethrough and means for discharging said layer from the end of said plate as desired.

20. The combination as set forth in claim 4 wherein said last-named means comprise a mechanical scraper.

21. In combination in a feeding device, a hopper containing granular matter and having opposed transverse slots therethrough, contacting reciprocating plates extending through said slots and completely closing both slots in one position, said plates opening one of said slots in another position, the upper of said plates upon reciprocation in one direction exposing the lower of said plates for gravitational loading by said hopper, said lower plate upon reciprocation in the opposite direction carrying granular matter through one of said slots, said matter being limited in dimensions by the sides and top of said slot, said top plate discharging said layer from said lower plate upon reciprocation in the same direction.

EMIL PIRON.